(12) United States Patent
Cis et al.

(10) Patent No.: US 11,603,190 B2
(45) Date of Patent: Mar. 14, 2023

(54) BRAKE ACTUATOR

(71) Applicant: Goodrich Corporation, Charlotte, NC (US)

(72) Inventors: Marcin Cis, Lower Silesia (PL); Patryk Szczesny, Lower Silesia (PL)

(73) Assignee: Goodrich Corporation, Charlotte, NC (US)

( * ) Notice: Subject to any disclaimer, the term of this patent is extended or adjusted under 35 U.S.C. 154(b) by 151 days.

(21) Appl. No.: 16/929,961

(22) Filed: Jul. 15, 2020

(65) Prior Publication Data
US 2021/0047027 A1    Feb. 18, 2021

(30) Foreign Application Priority Data
Aug. 13, 2019    (EP) .................................... 19461562

(51) Int. Cl.
| F16D 65/54 | (2006.01) |
| B64C 25/44 | (2006.01) |
| F16D 65/18 | (2006.01) |
| F16D 121/04 | (2012.01) |
| F16D 127/02 | (2012.01) |

(52) U.S. Cl.
CPC ............ B64C 25/44 (2013.01); F16D 65/183 (2013.01); F16D 65/54 (2013.01); *F16D 2121/04* (2013.01); *F16D 2127/02* (2013.01)

(58) Field of Classification Search
CPC .... F16D 65/54; F16D 65/0087; F16D 65/183; F16D 2121/04; F16D 55/40; B64C 25/44
See application file for complete search history.

(56) References Cited

U.S. PATENT DOCUMENTS

| 2,548,868 | A | * | 4/1951 | Christenot | ............ F16D 65/546 |
| | | | | | 188/79.62 |
| 3,575,268 | A | * | 4/1971 | Kimata | .................... F16D 65/54 |
| | | | | | 188/196 P |
| 3,706,360 | A | | 12/1972 | Nyunoya | |
| 3,850,268 | A | | 11/1974 | Guettier | |
| 4,016,959 | A | * | 4/1977 | Menard | .................... B61C 15/00 |
| | | | | | 188/196 B |

(Continued)

FOREIGN PATENT DOCUMENTS

| DE | 2854452 | A | * | 6/1980 | ............. F16D 55/02 |
| EP | 822351 | A2 | * | 2/1998 | ............. F16D 65/18 |

(Continued)

OTHER PUBLICATIONS

European Patent Office, European Office Action dated Dec. 14, 2021 in Application No. 19461562.1.

(Continued)

*Primary Examiner* — Robert A. Siconolfi
*Assistant Examiner* — Stephen M Bowes
(74) *Attorney, Agent, or Firm* — Snell & Wilmer L.L.P.

(57) ABSTRACT

A brake actuator for an aircraft braking system, comprising a housing, a sleeve, an annular member mounted to the housing extending radially inwardly for engagement with the ratchet teeth of the sleeve, a piston slidable along an axis (X), a piston head disposed at a first end of the pin portion, a cap disposed at a second end of the pin portion for operative engagement with a brake element of the housing, and a second position in which the piston head is drivingly disengaged from the sleeve.

13 Claims, 4 Drawing Sheets

(56) References Cited

U.S. PATENT DOCUMENTS

| | | |
|---|---|---|
| 6,234,279 B1 | 5/2001 | Jankowski et al. |
| 2003/0019317 A1 | 1/2003 | Dittmar et al. |
| 2005/0103581 A1* | 5/2005 | Boisseau ................. F16D 65/54 |
| | | 188/72.4 |
| 2016/0017651 A1 | 6/2016 | Eyanga et al. |
| 2016/0176518 A1 | 6/2016 | Eyanga et al. |

FOREIGN PATENT DOCUMENTS

| | | | |
|---|---|---|---|
| EP | 1972821 A1 * | 9/2008 | ........... F16D 55/226 |
| EP | 2913238 A1 | 9/2015 | |
| FR | 779359 A * | 1/1935 | ............. F16D 65/54 |
| FR | 782079 A * | 3/1935 | ............. F16D 65/54 |
| FR | 2192935 | 2/1974 | |
| FR | 2281860 A * | 4/1976 | .............. B60T 17/08 |
| GB | 191307625 A | 2/1914 | |

OTHER PUBLICATIONS

EPO, Examination Report dated Dec. 14, 2021 in EP Serial No. 19461562.1.

Search Report for EP Application No. 19461562.1 dated Mar. 6, 2020; 6pp.

* cited by examiner

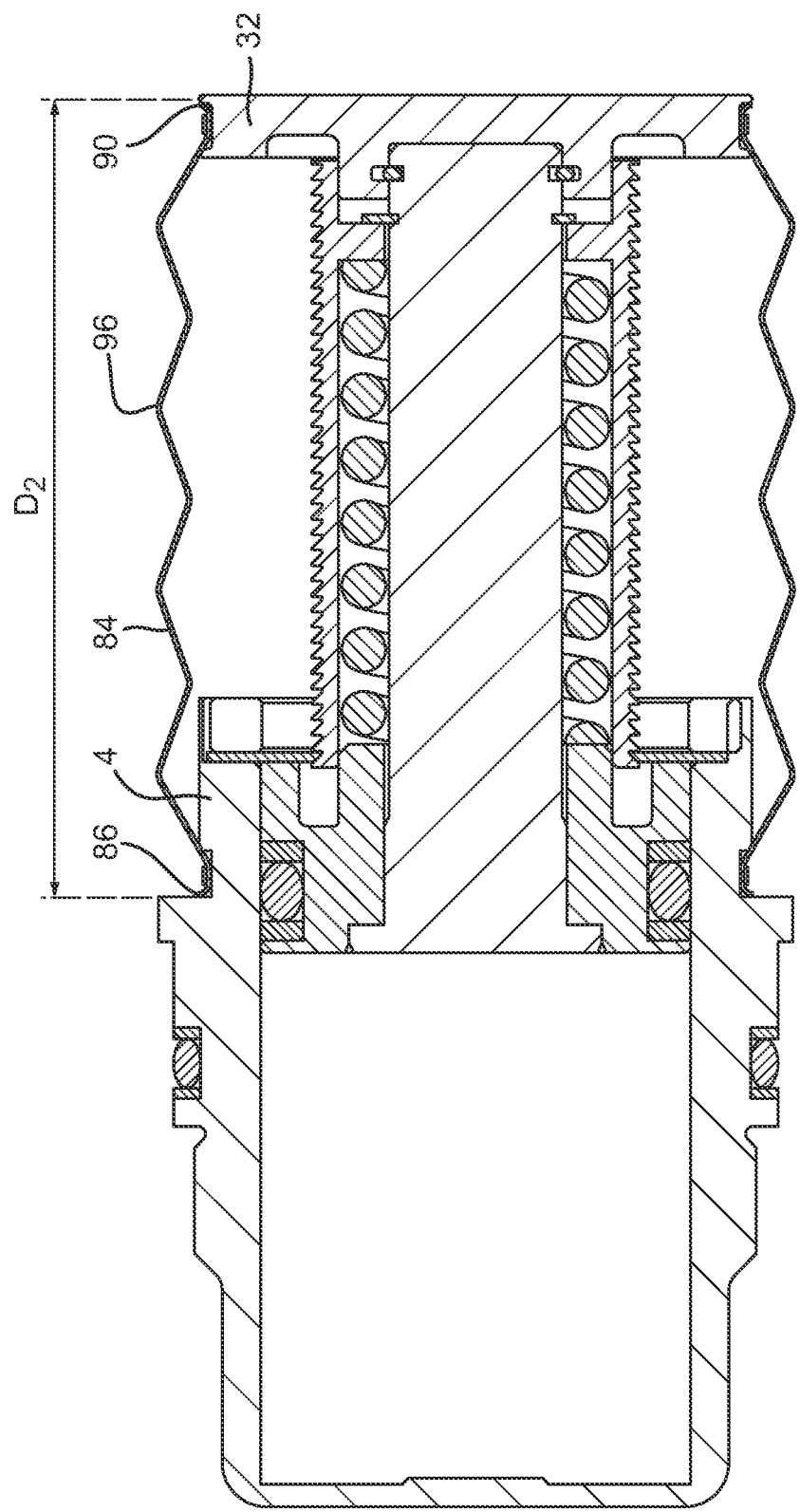

BRAKE ACTUATOR

CROSS-REFERENCE TO RELATED APPLICATIONS

This application claims priority to European Patent Application Serial No. EP19461562.1, filed on Aug. 13, 2020, entitled "BRAKE ACTUATOR." The contents of the foregoing application is hereby incorporated by reference for all purposes.

TECHNICAL FIELD

The present disclosure relates to a brake actuator for use, for example, in a braking system for an aircraft, e.g., a wheel thereof.

BACKGROUND

Braking systems for aircraft wheels typically comprise a stack of alternating static and rotary brake discs. One or more brake actuators are mounted to a static structure at an end of the brake disc stack and are operated to apply a force to the disc stack to bring the static and rotary brake discs into frictional contact, thus applying a braking force to the wheel. The actuator typically comprises a piston slidably mounted in a housing. Hydraulic fluid is admitted into the housing to urge the piston towards the brake disc stack. A spring returns the piston to its original position when the force from the hydraulic fluid is no longer applied so as to ensure that the piston is properly disengaged from the brake discs.

With time, the brake discs wear down, meaning that the travel required of the piston increases, leading to reduced responsiveness in the braking system.

It is therefore desirable to provide an actuator which compensates for this wear and which provides consistent travel of the piston as the brake discs wear down.

SUMMARY

According to an embodiment of the present disclosure, there is provided a brake actuator for an aircraft braking system, the brake actuator comprising a housing having an internal bore, a sleeve mounted for axial movement within the internal bore of the housing, the sleeve having a plurality of ratchet teeth on an external surface thereof, an annular member mounted to the housing and circumscribing the sleeve, the annular member comprising one or more resilient elements extending radially inwardly for engagement with the ratchet teeth of the sleeve, and a piston slidable along an axis, the piston comprising a pin portion mounted within the internal bore of the housing and extending axially through the sleeve, a piston head disposed at a first end of the pin portion, and a cap disposed at a second end of the pin portion for operative engagement with a brake element, the pin portion being mounted so as to be movable axially relative to the sleeve between a first position in which the piston head is drivingly engaged with the sleeve for urging the sleeve in a first direction along the internal bore of the housing, and a second position in which the piston head is drivingly disengaged from the sleeve, the one or more resilient elements preventing movement of the sleeve along the internal bore of the housing in a second direction opposite to the first direction.

The brake actuator may comprise a spring arranged between the piston head and the sleeve. The spring may be a compression spring.

The spring may circumscribe the pin portion and extending into a bore formed in the sleeve.

The brake actuator may comprise a seal circumscribing the piston head and sealing between the piston head and the internal bore of the housing. The seal may be an O-ring.

The annular member may be retained between a radially extending surface of the housing and a retaining element.

The retaining element may be a nut threadably engaged with the housing.

Each of the one or more resilient elements may be a substantially flat member comprising a tooth at a radially inner end thereof configured to engage the ratchet teeth of the sleeve.

A plurality of resilient elements may be provided that are equally spaced around the circumference of the annular member.

The annular member may comprise one or more keys extending from the annular member to locate the annular member in the housing and prevent movement of the annular member relative to the housing.

An expandable sleeve may circumscribe the actuator. The expandable sleeve may be secured at a first end to the housing, and at a second end to the cap. The expandable sleeve may seal a gap between the housing and the cap to prevent contaminants from entering an interior of the actuator via gap.

The expandable sleeve may be secured at the first end to an external surface of the housing and at the second end to a side surface of the cap. The first end may be secured to the external surface of the housing by a clamp, and the second end may be secured to the side surface of the cap by a clamp.

The expandable sleeve may comprise a bellows portion between the first end and the second end, to allow the expandable sleeve to expand and contract axially as the cap moves relative to the housing and maintain the sealing of the gap.

The pin portion and sleeve may be configured such that in the second position the pin portion directly or indirectly engages the sleeve, the sleeve thereby providing a hard stop for the pin portion.

The pin portion may comprise a retaining element extending radially therefrom for engaging a flange of the sleeve in the second position.

The retaining element may be a circlip received in a circumferentially extending groove in the pin portion. Alternatively, the retaining element may be at least one flange extending radially from and at least partially circumscribing the pin portion.

The cap may extend radially beyond the sleeve, and the retaining element is configured to prevent the cap from contacting the sleeve.

The piston head may comprise an annular cavity which is configured to receive a first end of the sleeve.

BRIEF DESCRIPTION OF THE DRAWINGS

Some exemplary embodiments and features of the present disclosure will now be described by way of example only, and with reference to the following drawings in which:

FIG. 5 shows a cross-sectional view of the brake actuator of FIG. 1 in a third configuration.

DETAILED DESCRIPTION

Figure 1:
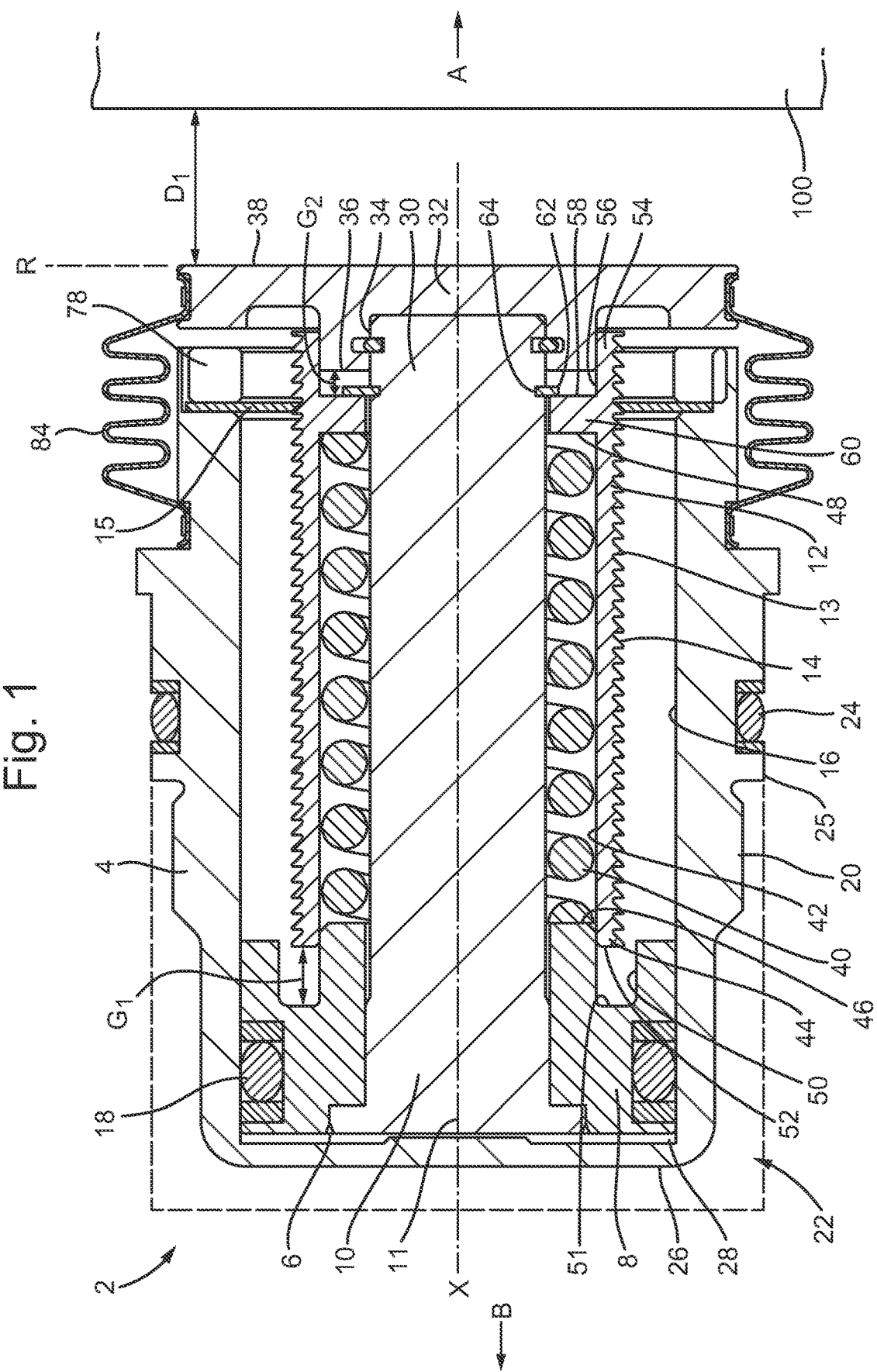
FIG. 1 shows a cross-sectional view of a brake actuator in accordance with the disclosure in a first configuration.
Figure 2:
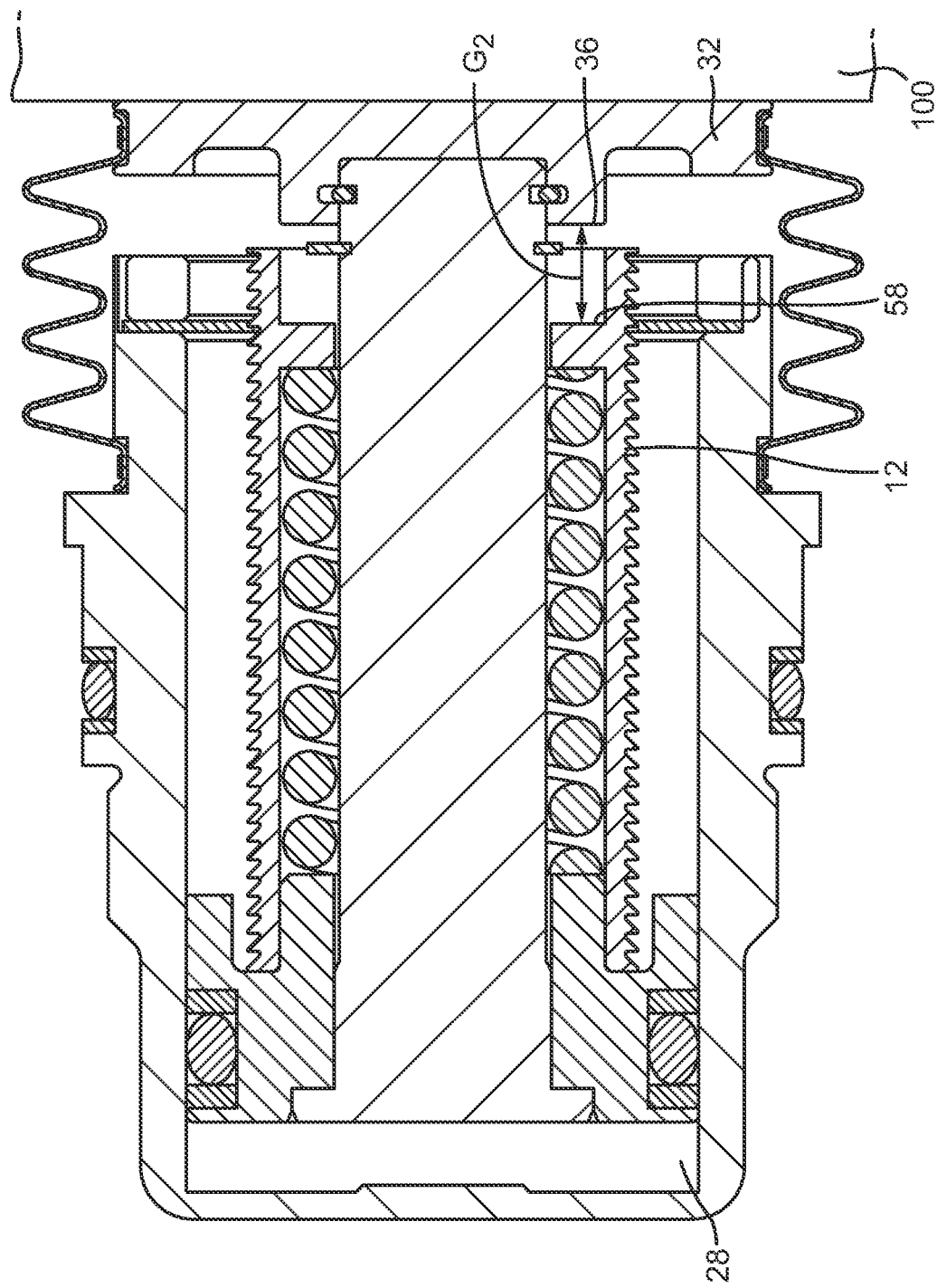
FIG. 2 shows a cross-sectional view of the brake actuator of FIG. 1 in a second configuration.

With reference to FIGS. 1 to 2, a brake actuator 2 according to an embodiment of the present disclosure is illustrated.

The brake actuator 2 comprises a housing 4 which receives a piston 6 having a longitudinal piston axis X and which in use applies a braking force to a brake element 100 such as a brake disc in an aircraft braking system.

The piston 6 comprises a piston head 8, which may be fixed, for example by welding, to a first end 10 of a pin portion 11. Alternatively, the piston head 8 and pin portion 11 may be a single unitary piece.

The brake actuator 2 further comprises a sleeve 12 having ratchet teeth 13 formed along an external (e.g., outer cylindrical) surface 14 of the sleeve 12. The pin portion 11 extends axially through the sleeve 12. The pin portion 11 is also slidably received in the sleeve 12. The brake actuator 2 further comprises a latching mechanism 15 for maintaining an axial position of the sleeve 12 in the housing 4.

The piston head 8 is slidably mounted in an internal bore 16 of the housing 4. A sliding seal 18, for example an O-ring, may surround the piston head 8 for slidably sealing the piston head 8 against the internal bore 16 of the housing 4. The housing 4 may, as shown, be provided with an external thread 20 for mounting the housing 4 in a hydraulic fluid supply cavity 22, which supplies pressurized hydraulic fluid to the piston head 8 to move the piston head 8 axially along the internal bore 16 of the housing 4. The housing 4 may also, as shown, be provided with an external seal 24, for example an O-ring, for sealing the housing 4 (e.g., a surface 25 thereof) with the hydraulic fluid supply cavity 22. An axial end 26 of the housing 4 may define one or more openings (not shown) for admitting pressurized hydraulic fluid from the hydraulic fluid supply cavity 22 into a cavity 28 in the housing 4 between the axial end 26 of the housing and the piston head 8, to apply a braking force to the piston head 8.

The piston 6 further comprises a cap 32 disposed at a second end 30 of the pin portion 11. The cap 32 may, as shown, comprise a bore 34 into which a portion of the second end 30 of the pin portion 11 is mounted. The cap 32 may be threadably engaged with the second end 30 of the pin portion 11 or retained by any other suitable means. The second end 30 of the pin portion 11 is operatively engaged with the brake element 100 via the cap 32.

The cap 32 comprises a first end surface 36 and an opposed second end surface 38. The bore 34 may be a formed in the first end surface 36 of the cap 32. The second end surface 38 of the cap 32 is configured for transmitting the braking force to the brake element 100 when the pressurized hydraulic fluid is admitted into the cavity 28 of the housing 4, as shown in FIG. 2.

A resilient member 40 (e.g., a spring) is provided to bias the piston head 8 such that the piston head 8 is biased in a direction away from the sleeve 12. The spring 40 may, as shown, be a preloaded compression spring 40. The spring 40 may extend between the piston head 8 and a portion of the sleeve 12, as shown in FIG. 1. In the illustrated embodiment, the spring 40 is a coil spring circumscribing the pin portion 11. The spring 40 is received in a first bore 42 formed in the sleeve 12, and extends between a rear surface 46 of the piston head 8 and a first bore end surface 48 of the first bore 42. The spring 40 may be connected to a portion of the rear surface 46 of the piston head 8. The piston head 8 is slidably received in the first bore 42 of the sleeve 12. The piston head 8 may further include an annular cut-out or cavity 50 into which a first end 44 of the sleeve 12 is received. When no force is applied to the piston head 8 by the pressurized hydraulic fluid (i.e., when the system is at rest), the spring 40 maintains a first axial gap $G_1$ between a radially extending surface 51 of the cavity 50 and an opposed first end surface 52 of the sleeve 12.

As the spring 40 biases the piston head 8 in the direction away from the sleeve 12, this biases the pin portion 11 and therefore the cap 32 towards a second end 54 of the sleeve 12. The sleeve 12 may, as shown, be provided with a second bore 56 formed in the second end 54 of the sleeve 12. A portion of the cap 32 may be slidably received within the second bore 56. The second bore 56 defines a second bore end surface 58. The first bore end surface 48 and the second bore end surface 58 may be provided on opposing sides of an inwardly extending flange 60 of the sleeve 12, as shown.

The pin portion 11 may be provided with a retaining element 62. The retaining element is axially spaced from the first end surface 36 of the cap 32. The retaining element 62 protrudes radially from the pin portion 11 to provide a stop surface. The retaining element 62 is configured to prevent the spring 40 from urging the cap 32, via the piston head 8 and the pin portion 11, beyond a predetermined rest position R. In the illustrated embodiment, the pin portion 11 is provided with a circumferentially extending groove 64, into which the retaining element 62, for example a circlip, is received. However, the retaining element 62 may be any suitable means for retaining the pin portion 11 against the sleeve 12, for example a flange extending radially from and circumscribing the pin portion 11, or multiple distinct flanges extending radially from and equidistantly spaced around the pin portion 11. When no force is applied to the piston head 8 by the pressurized hydraulic fluid (i.e., at rest), the spring 40 biases the piston head 8 in the direction away from the sleeve 12, which also biases the pin portion 11 in the same direction. This causes the retaining element 62 of the pin portion 11 to be urged against the second bore end surface 58 of the inwardly extending flange 60. This provides a stop surface and prevents the cap 32 from moving any further away from the brake element 100, and provides a second axial gap $G_2$ between the first end surface 36 of the cap 32 and the second bore end surface 58 of the sleeve 12.

As discussed above, a braking force is applied by admitting pressurised hydraulic fluid into the cavity 28 of the housing 4 to apply an axial force on the piston head 8. The force exerted by the fluid on the piston head 8 urges the piston head 8 axially against the biasing force of the spring 40 towards the first end 44 of the sleeve 12. This reduces the first axial gap $G_1$ between the radially extending surface 51 of the piston head 8 and the first end surface 52 of the sleeve 12. The motion of the piston head 8 is transmitted via the pin portion 11 to the cap 32, such that the cap 32 is urged away from the sleeve 12 and towards the brake element 100, which increases the second axial gap $G_2$ between the second bore end surface 58 of the sleeve 12 and the first end surface 36 of the cap 32, as shown in FIG. 2.

If prior to any force being applied to the piston head 8 by the pressurized hydraulic fluid (i.e., when the system is at rest) the distance $D_1$ between the second end surface 38 of the cap 32 and the brake element 100 (i.e., the operational travel of the cap 32) is less than the length of the first axial gap $G_1$, then the mechanism will operate normally. That is, the pressurized hydraulic fluid is admitted into the cavity 28 of the housing 4 to apply a force on the piston head 8, and when the force applied to the piston head 8 by the pressurised hydraulic fluid is greater than the resting compressive force applied to the piston head 8 by the spring 40 in the opposite direction, the piston head 8 will move in a first axial direction A so as to urge the second end surface 38 of the cap 32 against the brake element 100. This applies the braking force thereto without the radially extending surface 51 of the piston head 8 contacting the first end surface 52 of the sleeve 12. When the force from the pressurized hydraulic fluid is subsequently removed, the spring 40 will urge the piston head 8 in an opposing second axial direction B away from the first end 52 of the sleeve 12, and the retaining element 62 will be urged back against the second bore end surface 58 of the sleeve 12, returning the piston 6 to its rest position R, as shown in FIG. 1.

In other words, if at rest the distance $D_1$ between the second end surface 38 of the cap 32 and the brake element 100 is less than or equal to the length of the first axial gap $G_1$, no force will be transmitted to the sleeve 12 by engagement with the piston head 8.

However, prior to any force being applied to the piston head 8 by the pressurized hydraulic fluid, the distance $D_1$ between the second end surface 38 of the cap 32 and the brake element 100 may be greater than the length of the first axial gap $G_1$ (as may occur when the brake element 100 wears and reduces in thickness). In this situation, when the pressurized hydraulic fluid is admitted into the cavity 28 of the housing 4 to apply a force on the piston head 8, the piston head 8 will move in the first axial direction A as before, but before the second end surface 38 of the cap 32 reaches the brake element 100 the first axial gap $G_1$ will reduce to zero. As such, the piston head 8 (e.g., the radially extending surface 51 thereof) will move into driving engagement with the first end surface 52 of the sleeve 12. This is shown in FIG. 2. The sleeve 12 will then move axially with the piston head 8 in the first axial direction A, until the cap 32 comes into contact with the brake element 100 and applies the braking force. When the force from the pressurized hydraulic fluid is removed, the spring 40 will urge the piston head 8 back in the opposing second axial direction B as before, and the retaining element 62 will be urged back against the second bore end surface 58 of the sleeve 12. However, as will be described further below, the latching mechanism 15 prevents movement of the sleeve 12 in the second direction B such that the sleeve 12 remains in its new axial position. The piston 6 will therefore not move back to its original rest position R in the housing 4 as shown in FIG. 1, but will instead be held in a new axial position in the housing 4 closer to the brake element 100.

In other words, the actuator 2 operates different if (at rest) the distance $D_1$ between the second end surface 38 of the cap 32 and the brake element 100 is greater than the length of the first axial gap $G_1$. In this situation, the force of the pressurized hydraulic fluid admitted into the cavity 28 of the housing 4 is transmitted to the sleeve 12 by engagement with the piston head 8, to urge the sleeve 12 towards the brake element 100. The sleeve 12 will then be retained in a new axial position by the latching mechanism 15, such that the distance $D_1$ between the second end surface 38 of the cap 32 and the brake element 100 is returned to less than or equal to the length of the first axial gap $G_1$ when the force from the pressurized fluid is removed.

The latching mechanism 15 therefore provides an arrangement in which the operational travel of the piston 6 is maintained at less than or equal to the length of the first axial gap $G_1$. The size of the first axial gap $G_1$ may therefore be set to provide the desired optimal operational travel of the piston 6. This may improve the effectiveness of the braking system.

Figure 3:
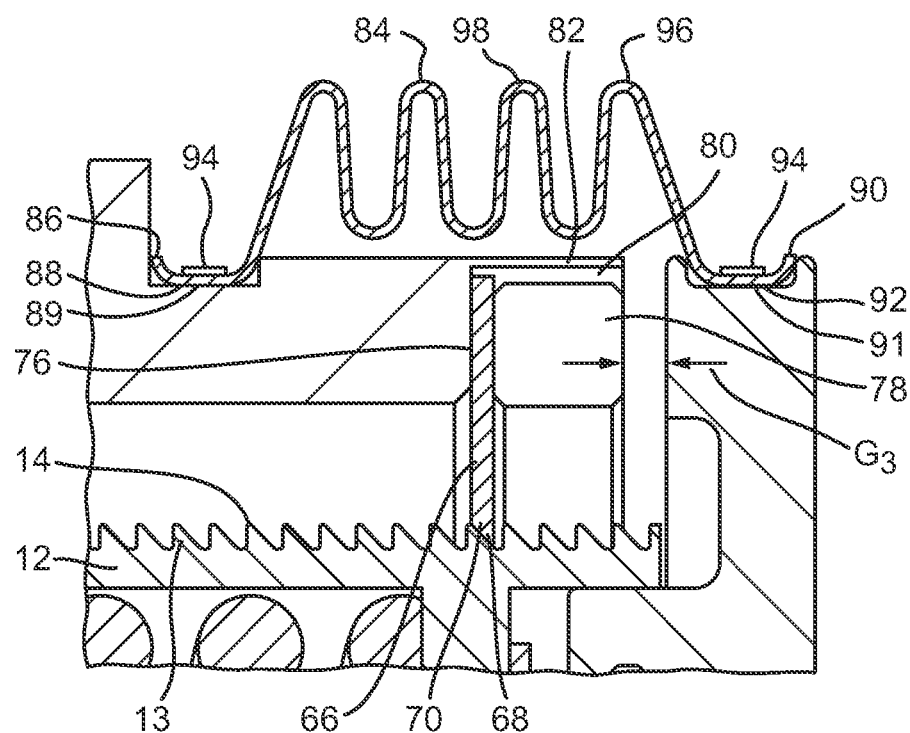
FIG. 3 shows a cross-sectional view of a portion of the brake actuator of FIG. 1.
Figure 4:
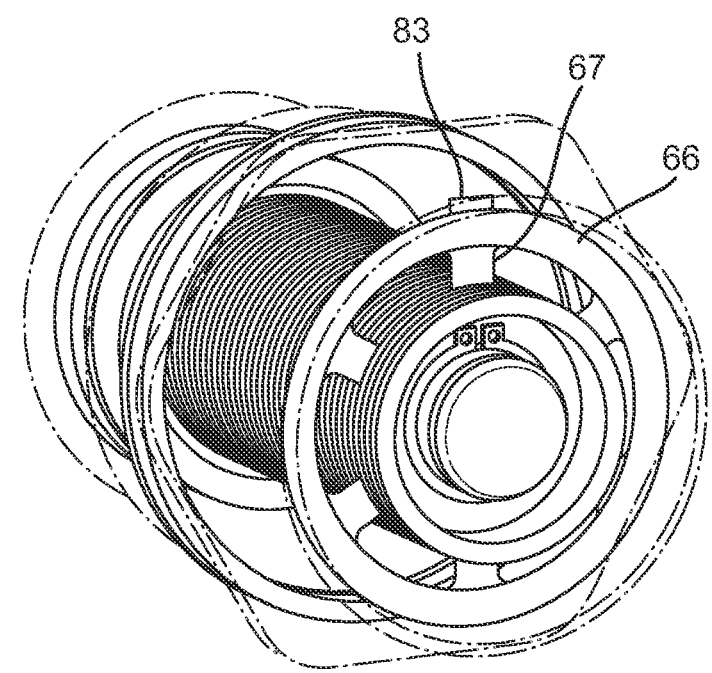
FIG. 4 shows an example latch mechanism for use in the actuator of FIG. 1.

With reference to FIGS. 3 and 4, the latching mechanism 15 comprises an annular member 66 mounted to the housing 4 and circumscribing the sleeve 12. The annular member 66 comprises multiple resilient elements 67 (e.g., tines or fingers) extending radially inwardly from the annular member 66. The resilient elements 67 are equally spaced around the circumference of the annular member 66. The resilient elements 67 may each form a tooth or pawl 68 (i.e., a bar or lever whose free end engages with the teeth of a ratchet so that the ratchet can only move in one direction) extending from the annular member 66 to a radially inner end 70 thereof. The teeth or pawls 68 are configured to conform to and engage with the ratchet teeth 13 of the sleeve 12, such that the sleeve 12 is able to move in the first axially direction A toward the brake element 100, but is not able to move in the second axial direction B away from the brake element 100. The spring force of the resilient elements 67 should be greater than the force required to compress the spring 40 to the close the first gap $G_1$, so that the resilient elements 67 do not allow the sleeve 12 to move in the first axial direction A during initial compression of the spring 40, but only after the braking force has been transmitted to the sleeve 12 by contact of the piston head 8 with the sleeve 12.

The annular member 66 may be retained against a radially extending surface 76 of the housing 4 by a retaining element 78, for example a nut 78 threadably engaged with the housing 4. The nut 78 may be threadably engaged with a thread 80 disposed on an axially extending surface 82 of the housing 4, as shown. The latching mechanism 15 may, as shown, extend radially from the axially extending surface 82 of the housing 4 to the external surface 14 of the sleeve 12. The retaining element 62 may maintain a third axial gap $G_3$ between the retaining element 78 and/or housing 4 and the first end surface 36 of the cap 32.

The annular member 66 may further comprise one or more keys 83 configured to locate the annular member 66 in the housing 4. The one or more keys 83 may project radially away from the annular member 66, and may be received in a slot in the housing 4. The one or more keys 83 may ease assembly, and may prevent the annular member 66 from rotating or otherwise moving during operation.

To provide protection from contaminants, an expandable sleeve or boot 84 may be provided external to the housing 4. The boot 84 circumscribes the actuator 2. The boot may be any suitable material, for example rubber. The boot 84 extends between the housing 4 and the cap 32 to seal the interior of the actuator 2. In use, the boot 84 may prevent contaminants from entering the interior of the actuator 2 via the third axial gap $G_3$.

The sleeve or boot 84 may be secured at a first end 86 to an external surface 88 of the housing 4, and at a second end 90 to a side (external) surface 92 of the cap 32. The first and second ends 86, 90 may each be secured to the respective surfaces by a clamp 94, which may be metal. The first end 86 may be secured to the housing 4 in a circumferential groove 89 disposed in the external surface 88 of the housing 4. The second end 90 may be secured to the cap 32 in a circumferential groove 91 disposed in the side surface 92 of the cap. The boot 84 extends around the entire circumference of the actuator 2, to assist in preventing the ingress of contaminants into the housing 4 via the third axial gap $G_3$ between the housing 4 and the cap 32, as shown.

The sleeve or boot 84 may comprise a bellows portion 96 between the first end 86 and the second end 90, which allows the boot 84 to expand and contract axially as the cap 32 moves relative to the housing 4. The bellows portion 96 is configured such when the actuator 2 is in its fully extended state (i.e., when the sleeve 12 or cap 32 cannot move any further in the first axial direction A), the boot 84 maintains the sealing between the housing 4 and the cap 32, as shown in FIG. 5. In other words, the length along the outer surface 98 of the boot 84 from the first end 86 and the second end 90 (i.e., its maximum possible axial length) is equal to or greater than a distance $D_2$ between the first end 86 and the second end 90 when the actuator 2 is in its fully extended state.

The disclosed arrangement provides a brake actuator 2 that compensates for wear of brake elements by means of a wear compensation sleeve 12 which moves axially relative to the housing 4 in one direction, with movement of the sleeve 12 in the opposing direction being prevented by a latching mechanism 15. The maximum operational extension of the piston 6 corresponds to substantially the full length of the sleeve 12, which may increase the duration of use of the component before needing to be reset or reassembled. All parts are reusable and reassembly is straightforward due to the simplified design and improved accessibility. The retaining element 62 provides a fixed stopping point for the piston head 8 to return to when no braking force is applied, such that the position of the cap 32 relative to the brake element 100 at rest will be consistent, leading to more consistent braking performance. By providing a hard stop, movement of the piston head 8 due to back pressure or vibration may be prevented. In addition, the provision of an expandable boot 84 provides improved protection against ingress of contaminants such as dust into the housing 4, which improves the reliability of the actuator 2.

It will be understood that the actuator 2 may have particular application in aircraft braking systems. However, the disclosure is not limited to such applications and may find use in any actuation system which may need to compensate for wear.

Although the figures and the accompanying description describe particular embodiments and examples, it is to be understood that the scope of this disclosure is not to be limited to such specific embodiments, and is, instead, to be determined by the following claims.

What is claimed is:

1. A brake actuator for an aircraft braking system, the brake actuator comprising:
    a housing having an internal bore;
    a sleeve mounted for axial movement within the internal bore of the housing, the sleeve having a plurality of ratchet teeth on an external surface thereof;
    an annular member mounted to the housing and circumscribing the sleeve, the annular member comprising one or more resilient elements extending radially inwardly for engagement with the plurality of ratchet teeth of the sleeve; and
    a piston slidable along an axis (X), the piston comprising a pin portion mounted within the internal bore of the housing and extending axially through the sleeve, a piston head disposed at a first end of the pin portion, and a cap disposed at a second end of the pin portion for operative engagement with a brake element, the pin portion being mounted so as to be movable axially relative to the sleeve between a first position in which the piston head is drivingly engaged with the sleeve for urging the sleeve in a first direction (A) along the internal bore of the housing, and a second position in which the piston head is drivingly disengaged from the sleeve, the one or more resilient elements preventing movement of the sleeve along the internal bore of the housing in a second direction (B) opposite to the first direction (A), wherein:
    the pin portion comprises a retaining element extending radially therefrom for engaging a flange of the sleeve in the second position,
    the retaining element is a circlip received in a circumferentially extending groove in the pin portion, or the retaining element is at least one flange extending radially from and at least partially circumscribing the pin portion, and
    the cap extends radially beyond the sleeve, and the retaining element is configured to prevent the cap from contacting the sleeve.

2. The brake actuator of claim 1, further comprising a spring arranged between the piston head and the sleeve, the spring circumscribing the pin portion and extending into a bore formed in the sleeve.

3. The brake actuator of claim 1, further comprising a seal circumscribing the piston head and sealing between the piston head and the internal bore of the housing.

4. The brake actuator of claim 1, wherein the annular member is retained between a radially extending surface of the housing and the retaining element.

5. The brake actuator of claim 1, wherein each of the one or more resilient elements is a substantially flat member comprising a tooth at a radially inner end thereof configured to engage the plurality of ratchet teeth of the sleeve.

6. The brake actuator of claim 1, wherein a plurality of resilient elements are provided that are equally spaced around a circumference of the annular member.

7. The brake actuator of claim 1, wherein the annular member comprises one or more keys extending from the annular member to locate the annular member in the housing and prevent movement of the annular member relative to the housing.

8. The brake actuator of claim 1, wherein the pin portion and the sleeve are configured such that in the second position the pin portion directly or indirectly engages the sleeve, the sleeve thereby providing a hard stop for the pin portion.

9. The brake actuator of claim 1, wherein the piston head comprises an annular cavity which is configured to receive a first end of the sleeve.

10. The brake actuator of claim 1, further comprising an expandable sleeve circumscribing the brake actuator, wherein the expandable sleeve is secured at a first end to the housing, and at a second end to the cap, the expandable sleeve sealing a gap ($G_3$) between the housing and the cap to prevent contaminants from entering an interior of the brake actuator via the gap ($G_3$).

11. The brake actuator of claim 10, wherein the expandable sleeve is secured at the first end to an external surface of the housing and is secured at the second end to a side surface of the cap.

12. The brake actuator of claim 10, wherein the expandable sleeve comprises a bellows portion between the first end and the second end, to allow the expandable sleeve to expand and contract axially as the cap moves relative to the housing and maintain the sealing of the gap ($G_3$).

13. A brake actuator for an aircraft braking system, the brake actuator comprising:
    a housing having an internal bore;
    a sleeve mounted for axial movement within the internal bore of the housing , the sleeve having a plurality of ratchet teeth on an external surface thereof;

an annular member mounted to the housing and circumscribing the sleeve, the annular member comprising one or more resilient elements extending radially inwardly for engagement with the plurality of ratchet teeth of the sleeve; and a piston slidable along an axis (X), the piston comprising a pin portion mounted within the internal bore of the housing and extending axially through the sleeve, a piston head disposed at a first end of the pin portion, and a cap disposed at a second end of the pin portion for operative engagement with a brake element, the pin portion being mounted so as to be movable axially relative to the sleeve between a first position in which the piston head is drivingly engaged with the sleeve for urging the sleeve in a first direction (A) along the internal bore of the housing, and a second position in which the piston head is drivingly disengaged from the sleeve, the one or more resilient elements preventing movement of the sleeve along the internal bore of the housing in a second direction (B) opposite to the first direction (A), wherein the piston head comprises an annular cavity which is configured to receive a first end of the sleeve.

\* \* \* \* \*